(12) United States Patent
Helppi et al.

(10) Patent No.: US 10,684,756 B2
(45) Date of Patent: Jun. 16, 2020

(54) AVIONICS PICTURE-IN-PICTURE DISPLAY

(71) Applicant: Rockwell Collins, Inc., Cedar Rapids, IA (US)

(72) Inventors: Benjamin M. Helppi, Anamosa, IA (US); Evie R. Johnson, Walker, IA (US); Douglas M. McCormick, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 463 days.

(21) Appl. No.: 15/140,200

(22) Filed: Apr. 27, 2016

(65) Prior Publication Data

US 2017/0315706 A1    Nov. 2, 2017

(51) Int. Cl.

| | | |
|---|---|---|
| *G06F 3/0481* | (2013.01) | |
| *G06F 3/0484* | (2013.01) | |
| *B64D 43/00* | (2006.01) | |
| *G01C 23/00* | (2006.01) | |
| *G08G 5/00* | (2006.01) | |

(52) U.S. Cl.
CPC ......... *G06F 3/04845* (2013.01); *B64D 43/00* (2013.01); *G01C 23/00* (2013.01); *G06F 3/0481* (2013.01); *G08G 5/0021* (2013.01); *G08G 5/0052* (2013.01); *G06F 2203/04803* (2013.01); *G06F 2203/04806* (2013.01)

(58) Field of Classification Search
CPC .. G06F 3/0481; G06F 3/04845; G06F 3/0412; B64D 43/00
See application file for complete search history.

(56) References Cited

U.S. PATENT DOCUMENTS

| | | | | |
|---|---|---|---|---|
| 5,519,392 A | * | 5/1996 | Oder | G01C 21/22 340/990 |
| 5,519,618 A | * | 5/1996 | Kastner | G01S 13/91 701/120 |
| 5,732,384 A | * | 3/1998 | Ellert | G08G 5/0026 701/120 |
| 6,020,831 A | * | 2/2000 | Nishida | G01S 7/22 340/945 |
| 6,047,233 A | * | 4/2000 | Salvatore, Jr. | G01S 7/22 701/120 |
| 6,466,235 B1 | * | 10/2002 | Smith | G06F 3/04847 701/14 |
| 6,816,780 B2 | * | 11/2004 | Naimer | G01C 21/005 244/1 R |
| 7,321,318 B2 | * | 1/2008 | Crane | G01C 23/005 340/971 |
| 8,462,018 B1 | * | 6/2013 | Shepherd | G01C 23/00 340/945 |

(Continued)

*Primary Examiner* — Phenuel S Salomon
(74) *Attorney, Agent, or Firm* — Suiter Swantz pc llo

(57) ABSTRACT

A display interfacing system and an automated graphics system enable presentation of a second picture within a first picture of an avionics display. The first picture provides broad information pertaining to navigating an aircraft vehicle within a specified region. The broad information may include a flight plan map, and the specified region may be navigated using a VOR radial displayed on the flight plan map. The second picture provides clarifying information about an aspect of the first picture. Interaction with the second picture may also provide clarifying information about an aspect of the second picture.

20 Claims, 9 Drawing Sheets

(56) References Cited

U.S. PATENT DOCUMENTS

| | | | | |
|---|---|---|---|---|
| 9,132,913 B1* | 9/2015 | Shapiro | | B64C 19/00 |
| 9,691,287 B1* | 6/2017 | Shapiro | | G06F 3/013 |
| 2003/0158975 A1* | 8/2003 | Frank | | G06F 8/34 |
| | | | | 719/331 |
| 2004/0174398 A1* | 9/2004 | Luke | | G06F 3/0481 |
| | | | | 715/856 |
| 2006/0025679 A1* | 2/2006 | Viswanathan | | A61B 6/548 |
| | | | | 600/424 |
| 2006/0184966 A1* | 8/2006 | Hunleth | | G06F 3/017 |
| | | | | 725/39 |
| 2007/0022379 A1* | 1/2007 | Hara | | H04N 21/21805 |
| | | | | 715/723 |
| 2007/0182589 A1* | 8/2007 | Tran | | G01C 23/00 |
| | | | | 340/961 |
| 2008/0291918 A1* | 11/2008 | Turcot | | H04Q 3/0087 |
| | | | | 370/395.3 |
| 2010/0066564 A1* | 3/2010 | Filliatre | | G01C 23/005 |
| | | | | 340/945 |
| 2010/0097241 A1* | 4/2010 | Suddreth | | G01C 23/00 |
| | | | | 340/972 |
| 2012/0036016 A1* | 2/2012 | Hoffberg | | G05B 15/02 |
| | | | | 705/14.58 |
| 2012/0310524 A1* | 12/2012 | Pepitone | | G01C 23/00 |
| | | | | 701/411 |
| 2013/0179842 A1* | 7/2013 | Deleris | | G06F 3/0484 |
| | | | | 715/853 |
| 2013/0204523 A1* | 8/2013 | He | | G01C 23/005 |
| | | | | 701/527 |
| 2015/0103734 A1* | 4/2015 | Bobrek | | H04L 47/6275 |
| | | | | 370/316 |
| 2015/0239574 A1* | 8/2015 | Ball | | B64C 45/00 |
| | | | | 701/3 |
| 2016/0057032 A1* | 2/2016 | Tieftrunk | | G01C 21/00 |
| | | | | 701/533 |
| 2016/0209234 A1* | 7/2016 | Passinger | | B64D 43/00 |
| 2017/0032576 A1* | 2/2017 | Mazoyer | | G08G 5/0021 |
| 2017/0075528 A1* | 3/2017 | Kothari | | G06F 3/0483 |
| 2017/0154537 A1* | 6/2017 | Moravek | | B64D 43/00 |

* cited by examiner

AVIONICS PICTURE-IN-PICTURE DISPLAY

This application relates to pending U.S. application Ser. No. 14/584,807, by Jason A. Myren, et al., filed Dec. 29, 2014, which is incorporated herein by reference in its entirety.

BACKGROUND

An avionics display often displays numerous types of data. If categorized, this data may be, but is not limited to, critical data, non-critical data, primary data, secondary data, redundant data, or combinations thereof. Each category may have separate sub-categories. For example, the level of criticality of critical data may also include sub-categories, including but not limited to, of minor, of major, of hazardous, of catastrophic, and of no safety effect. Due to the various types and amount of data to be displayed on the avionic display, prioritization, organization and presentation of data is crucial to effective operation of any avionics vehicle or the successful completion of a task designed for the avionics vehicle.

For example, a flight pattern can be an extremely complex data unit/file organized by a flight management system (FMS) and displayed on the avionics display. If organized and presented efficiently, a pilot ensures strategic conflict awareness and navigates a properly managed airspace. On the other hand, unorganized, cluttered, ineffectively prioritized, poorly annunciated, or ineffectively presented flight patterns can have disastrous consequences.

In the context of search and rescue (SAR) patterns, the display complexity of the flight patterns may increase proportionally to a number of legs, waypoints and/or leg terminators assigned to the flight pattern. Often, a flight map is configured to present the entire flight pattern, including its numerous legs, waypoints and/or leg terminators in a relatively small area on a single display, sometimes without a zoom feature. Even if a zoom feature is included with a flight plan map presentation system (e.g., FMS), often the zoom feature requires many sequential click-drag-zoom, click-drag-zoom procedures in order to zoom in on a desired flight plan map location, which can be burdensome when using a Cursor Control Device (CCD). Further, many FMS/flight plan map systems utilize a resistive-single-touch display that does not allow a "pinch-to-zoom" feature (i.e., such a feature requires multi-touch enablement). Therefore, it would be desirous to obtain more efficient presentation methods, apparatuses, interfaces and/or systems in the avionics field.

SUMMARY

In one aspect, the inventive concepts disclosed herein are directed to a system for presenting avionics data. The system includes a display and a processor in communication with the display. The system includes a memory in communication with the processor, and computer executable program code stored on the memory. The computer executable program code is configured to execute on the processor configured for: receiving and prioritizing first avionics data for display; displaying the first avionics data in a first picture, the first picture comprising a graphical user interface; receiving one or more user inputs associated with a first portion of the graphical user interface; generating second avionics data associated with a second picture based on the one or more user inputs; and presenting the second picture within the graphical user interface based upon the prioritization.

In a further aspect, the inventive concepts disclosed herein are directed to a display interface for presenting avionics data. The display interface includes an automated graphics system (AGS) in communication with a flight management system (FMS). The AGS is configured to receive a flight plan and first graphical data for the flight plan from the FMS. The display interface includes a processor configured to: parse and prioritize the first graphical data for display; display the first graphical data and the flight plan as a graphical user interface; receive one or more user inputs associated with a first portion of the graphical user interface; generate second graphical data based on the one or more user inputs; and present a second picture within the graphical user interface based upon the second graphical data and the prioritization.

In a further aspect, the inventive concepts disclosed herein are directed to a method for presenting avionics data. The method includes receiving and prioritizing first avionics data for display. The method includes displaying the first avionics data in a first picture. The first picture is a graphical user interface. The method includes receiving one or more user inputs associated with a first portion of the graphical user interface. The method includes, generating second avionics data associated with a second picture based on the one or more user inputs. The method includes presenting the second picture within the graphical user interface based upon the prioritizing and the second avionics data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
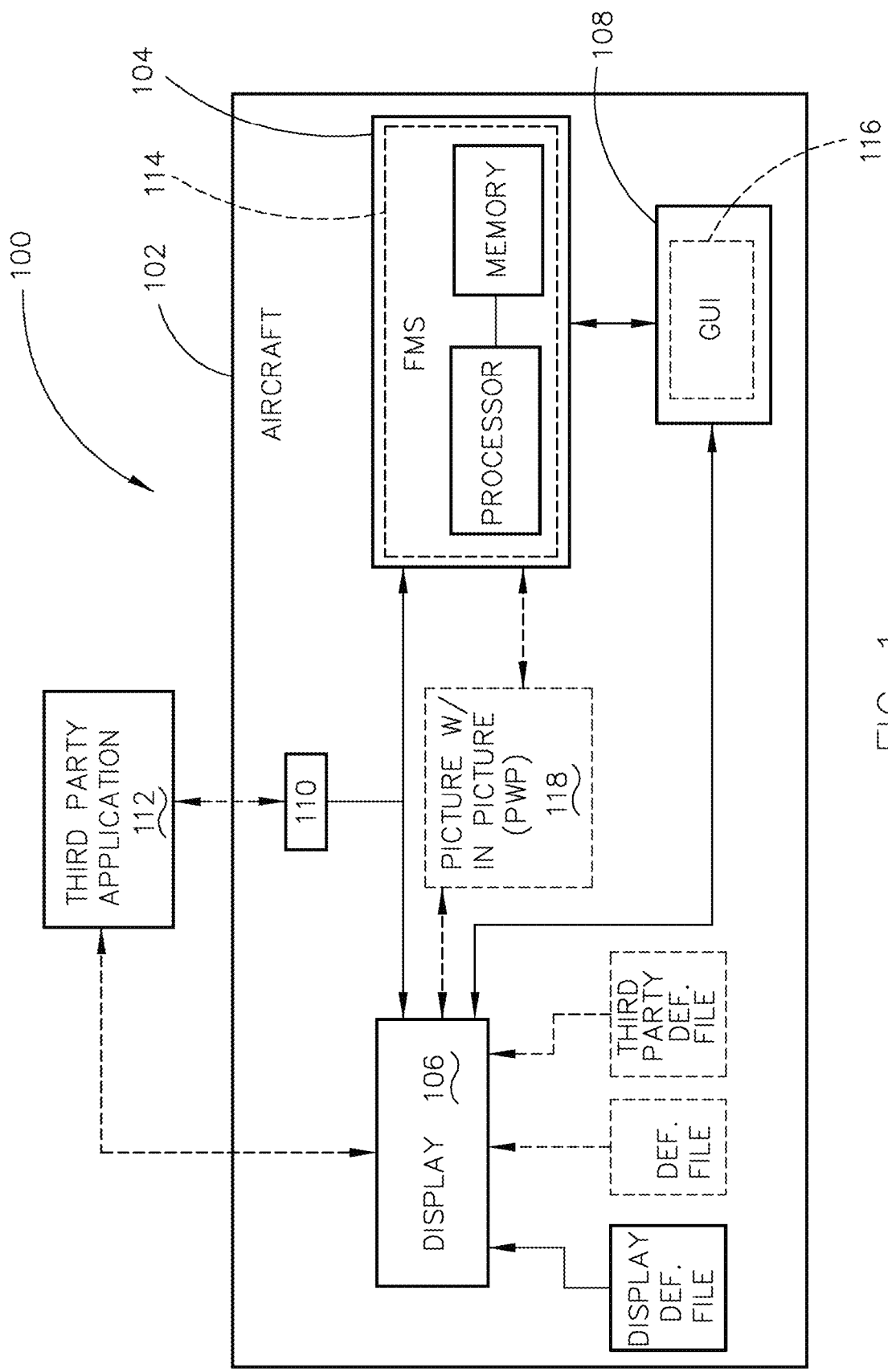
FIG. 1 is an exemplary embodiment of a system for displaying avionics data, according to the inventive concepts disclosed herein.

"SAR pattern" as used herein means search and rescue pattern. In avionics, SAR patterns include, but are not limited to, parallel track patterns, sector search patterns, expanding square search patterns, or combinations thereof.

"Waypoint" as used herein means a 2-dimensional or 3-dimensional point in space and/or time for which a set of coordinates are defined. In avionics, waypoints may be electrically, digitally, or otherwise created to aid in implementing a flight plan.

"Leg terminator" as used herein means an electrical, digital or otherwise created endpoint to a flight leg as used in implementing a flight plan. A leg terminator may comprise one or more different types, including but not limited to, a fix terminator, an altitude terminator, an intercept next leg terminator, an intercept radial terminator, an intercept distance terminator, and a manual terminator.

"Definition file" as used herein means a loadable standard format file inside the cockpit display system (CDS). A definition file includes definitions of static elements, initial states and symbols. A definition file may also allocate graphic resources, contain multiple layers, contain widgets within a layer of the multiple layers, contain graphical layer connections, or combinations thereof. A definition file may be supported by virtual application prototyping systems (VAPS) and model based development (MBD) systems. The interpretation of the definition file by the CDS results in the creation (e.g., instantiation and parameterization) of widgets.

"User Application" (UA) as used herein means an application that is configured to receive dedicated aircraft data and determine dedicated output, including dedicated display output. The UA determines the look and feel of the display, its graphical user interfaces (GUIs), and its display images. The UA sets runtime modifiable parameters and receives event messages. The UA may be configured to act on an event as indicated by the event messages, which may result in a modified display, GUI, or display image.

"Automated Graphics System" (AGS) as used herein means a system that defines the look of widgets. The AGS receives parameters sent by UAs and sets parameters in corresponding widgets. The AGS draws the widgets on a display as directed by a UA (e.g., FMS). The AGS controls the graphics hardware and corresponding functions (e.g., graphics engine, bitmap, merge, and combinations thereof). The AGS processes cursor interactions with a display and selects one or more UAs to drive the display.

"Widget" as used herein means an element of a GUI that presents information (e.g., on a display) or provides a specific way for a user to interact with the operating system or a user application. Widgets include, but are not limited to, icons, pull-down menus, buttons, selection boxes, progress indicators, on-off checkmarks, scroll bars, windows, window edges (that let you resize the window), toggle buttons, form, and many other elements and/or devices for presenting information and for inviting, receiving, and responding to user input.

"ARINC 661" as used herein means a standard that defines an interface between a CDS and a UA. This standard defines two external interfaces between the CDS and the UA. The first is the interface between avionics equipment (e.g., user systems such as CCD) and the display systems graphics generators (AGS). The second is the interface for symbols and their parameters/behaviors (e.g., widgets). The ARINC 661 standard defines a set of widget types (e.g., circle, push button, label, or combinations thereof), a set of attributes for each widget type, an interface to create a widget (e.g., by building a definition file), an interface to modify the parameters of a widget, and an interface to receive widget events (e.g., if applicable).

"Flight Plan Map" as used herein means an electrical, digital or otherwise created representation of an intended flight course, having one or more waypoints, one or more leg terminators, or combinations thereof. The flight plan map is generally created by a flight management system (FMS).

"Picture" as used herein means an image having at least a specified spatial format. The image may also have one or more specified data types, data contents (e.g., text string, video frame, icon, or combinations thereof), and/or image resolutions.

"Graphical user interface" (GUI) as used herein means a user-interactive picture (i.e., the GUI is configured to receive one or more user inputs).

"Spatial format" as used herein means the overall "size" of an image displayed on a display. For example, in computer graphics, a common spatial format is 1024×768.

"Contextual user input" as used herein means an operator/user input applicable to a context in which it is received. For example, if an operator/user is interacting with a picture, a contextual user input that includes an audio voice command of "zoom-in" would be applicable to the context in which it is received. By way of another example, if the operator/user is navigating a specified region with a GUI representing a Very-High Frequency Omnidirectional Range (VOR) radial, a voice command of "zoom-out" may not be applicable to the context in which it is received if the VOR radial is already at a maximum viewing dimension/range.

"Memory" as used herein, and unless otherwise specified, means any storage medium known in the art suitable for storing program instructions executable by the associated one or more processors and one or more databases (e.g., computer executable program code). For instance, memory may include, but is not limited to, a read-only memory, a random access memory, a magnetic or optical memory device (e.g., disk), a magnetic tape, a solid state drive, or combinations thereof. In embodiments, the memory includes a buffer (e.g., frame buffer) and/or a cache. The memory includes non-transitory memory. In embodiments, the memory may be located remotely with respect to the platform.

"Processor" as used herein means any processing device, including but not limited to, a microprocessor, an application specific integrated circuit (ASIC), a field programmable gate array (FPGA), a central processing unit (CPU), an arithmetic logic unit (ALU), a digital signal processor (DSP), or combinations thereof.

"Module," "block" or "sub-block" as used herein means a combination of hardware and software configured to perform one or more steps, processes and/or algorithms of the inventive concepts disclosed herein.

"Rendering information" as used herein means information in data or binary format that is used to generate an image (e.g., 2D or 3D). Rendering information includes, but is not limited to coloring scheme data (e.g., 24-bit RGB color model), transformational data (e.g., linear, affine, rotation, or combinations thereof), overlay or convolving information (e.g., positioning a second picture within a first picture), or combinations thereof.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to displaying a second picture within a first picture to provide additional information to an operator of the display system. By correlating information presented in the second picture to information presented in the first picture, varying an amount of detail presented in at least the second picture, and simplifying the presentation of the pictures, the display system delivers enhanced clarity without interfering with the cognitive processing of the operator.

Referring now to FIG. 1, an embodiment of a system 100 according to the inventive concepts disclosed herein includes a platform 102, a display interfacing system 104, a display 106, a user interface 108, other internal systems and/or other system components 110, other external systems and/or other system components 112, a user application 114, a graphical user interface 116, and a picture-within-picture (PWP) module 118. The various components of system 100 may be interconnected by multiple signals (e.g., bi-directional, electric, digital, electromagnetic, or combinations thereof).

In an exemplary embodiment, the platform 102 includes a vehicle platform, including an avionics platform. For example, the platform 102 may be an aircraft platform.

In an exemplary embodiment, the display interfacing system 104 includes a CDS within an aircraft flight deck. In an exemplary embodiment, the CDS includes one or more user applications (UA) 114. The one or more UA 114 include, but are not limited to, a flight management system (FMS), a Traffic Collision Avoidance System (TCAS), an Electronic Flight Bag, a Mission System (e.g., military), a Control Display Unit (CDU), or an Engine Indicating and Crew Alert System (EICAS).

In an exemplary embodiment, the display 106 includes a display device and an AGS. In an exemplary embodiment, the AGS of the display 106 is in communication with the one or more UA 114.

In an exemplary embodiment, the display device of display 106 includes any display device known in the art. In embodiments, the display device may include, but is not limited to, a liquid crystal display (LCD), an organic light-emitting diode (OLED) based display, a CRT display, or combinations thereof. In a general sense, any display device capable of integration with the user interface 108 is suitable for implementation in the present disclosure. In the case of a touchscreen interface device, those skilled in the art should recognize that a large number of touchscreen interface devices may be suitable for implementation in the present disclosure. For instance, the display device 106 may be integrated with a touchscreen interface, including, but not limited to, a capacitive touchscreen, a resistive touchscreen, a surface acoustic based touchscreen, an infrared based touchscreen, or combinations thereof. In a general sense, any touchscreen interface capable of integration with the display portion of the display device 106 is suitable for implementation with the inventive concepts disclosed herein.

In an exemplary embodiment, the display 106 is a touchscreen display and the GUI 116 is a touch-GUI. It is noted that while embodiments disclosed herein depict the GUI 116 as a touch-GUI, other methods of user interaction with the GUI 116 are contemplated and encompassed by the inventive concepts disclosed herein. For example, the other internal systems/other system components 110 may include a camera or eye measurement system to detect a gaze of the operator and highlight a portion of the GUI 116 that is within the gaze of the operator. Further interaction (e.g., zoom-in) with the highlighted portion may be accomplished after receiving a confirming user input (e.g., second eye gesture together with contextual user input, audio signal/command, soft/hard key input, or combinations thereof). By way of another example, the other internal systems/other system components 110 may include a microphone for receiving audio signals/commands for interacting with the GUI 116. It is noted that various combinations of user input devices will be recognized by those skilled in the art for interacting with GUI 116 and are encompassed by the inventive concepts disclosed herein.

In an exemplary embodiment, the user interface 108 includes one or more input devices. For example, the one or more input devices may include a sensor (e.g., an optical sensor, a camera, a motion tracking sensor, or an eye tracking sensor), an electroencephalograph (EEG) sensor, or combinations thereof, a pointer device (e.g., a mouse, touch pad, trackball, or combinations thereof), a microphone, one or more buttons, a gyroscope, a joystick, a haptic device, or combinations thereof. In an exemplary embodiment, the user interface 108 includes one or more output devices. For example, the one or more output devices may include a display, a projector (e.g., image projector, a retina projector, or combinations thereof), one or more liquid crystal cells, one or more light emitting diodes (LEDs), a speaker, a bell, a gauge, a vibration-producing unit, or combinations thereof.

In an exemplary embodiment, the other internal systems/system components 110 include, but are not limited to, flight controls, global positioning system (GPS), processor(s), sensor(s) (e.g., microphone, camera, or combinations thereof), receiver(s), a transmitter(s), transceiver(s), networking components (e.g., wired or wireless network card, one or more antennas, fiber optic cables, wires, bus, or combinations thereof), database(s), definition file(s), or combinations thereof. In an exemplary embodiment, a UA 114 (e.g., FMS) is in communication with the other internal systems/system components 110 to receive information from the other internal systems/system components 110 for display as a picture-within-a picture. For example, the UA 114 may be in communication with a Traffic Collision Avoidance System (TCAS), an Electronic Flight Bag, a Mission System (e.g., military), a Control Display Unit (CDU), or an Engine Indicating and Crew Alert System (EICAS). For instance, the FMS may be configured to receive and display a warning generated by the EICAS as a second picture within a first picture of a display 106 communicatively coupled with UA 114.

In an exemplary embodiment, other internal systems/system components 110 include, but are not limited to, an ARINC 429 data bus, an Ethernet data bus, or a Peripheral Component Interconnect (PCI) or PCI-Express (PCI-E) data bus.

In an exemplary embodiment, the other external systems/system components 112 include, but are not limited to, a third party application, air traffic control (ATC) communication station(s), radio transmitters/receivers, additional aircraft(s), communication link(s) (e.g., network link between ATC station, an additional aircraft, intranet, internet service provider (ISP), or combinations thereof), weather instruments, instrument landing systems (ILS), or combinations thereof.

In some embodiments, when the system 100 is in communication with the third party application 112, the display 106 is configured to receive and implement a third party definition file.

In an exemplary embodiment, system 100 is in accordance with one or more communication protocols and/or display standards. For example, system 100 may be in accordance with Aeronautical Radio Inc. (ARINC) standards. For instance, the system 100 may be in accordance with the ARINC 661 standard.

In an exemplary embodiment, an operator/user may comprise a driver, a navigator, a pilot, a copilot, a remote pilot, a remote copilot, a co-operator, a remote operator, a remote co-operator, or combinations thereof.

Figure 2:
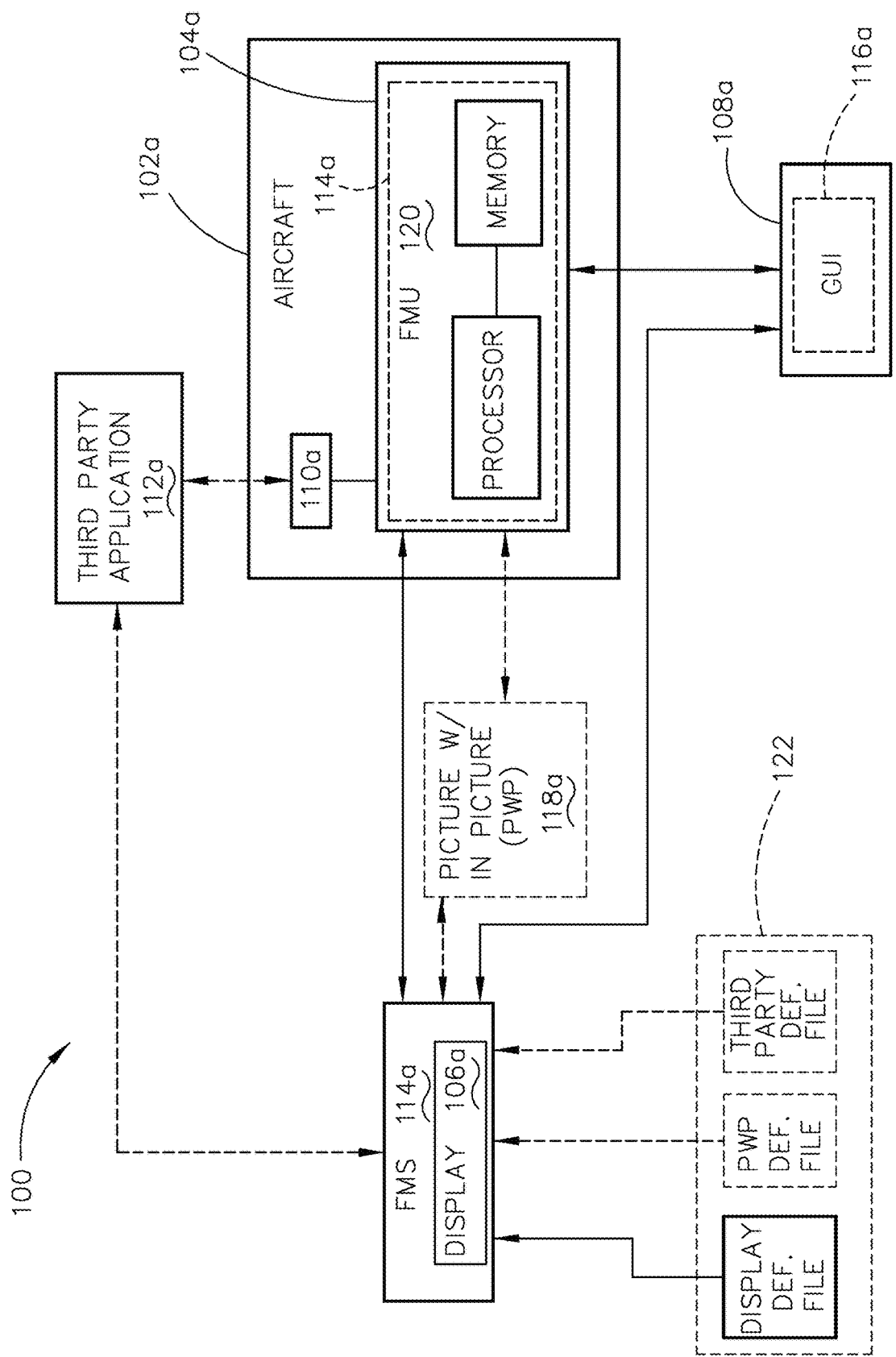
FIG. 2 is another exemplary embodiment of a system for displaying avionics data, according to the inventive concepts disclosed herein.

Referring now to FIG. 2, an exemplary embodiment of system 100A includes a flight management unit (FMU) and operating system (OS) 120, a database 122, and components similar to system 100. In an exemplary embodiment, the database 122 may contain data for long-term storage, reducing the memory required on a platform 102a. In an exemplary embodiment, the database 122 contains a definition file for loading a UA 114a. In another exemplary embodiment, the platform 102a has sufficient memory for maintaining one or more definition files.

System 100A is implemented similarly to system 100 except that the platform 102a of system 100A may be an unmanned aerial vehicle (UAV). In this regard, a greater number of components of system 100A, will be located external to the platform 102a, as compared to system 100 and platform 102. For example, the display 106a, the user interface 108a, the other external systems/other system components 112a, and the database 122 may be located external to the UAV platform 102a. It is noted that while FIG. 2 depicts specific components (e.g., 108a, 112a, 118a, and 122) external to the platform 102a, this specific depiction is not limiting. Persons skilled in the art will recognize additional components or fewer components that may be external to platform 102a, as compared to platform 102, and still be in accordance with the inventive concepts disclosed herein.

In an exemplary embodiment, the display interfacing system 104 and AGS of display 106 are configured to enable and implement the picture-within-picture (PWP) module 118. For example, during initialization of the display interfacing system 104 and display 106, dynamic memory allocation may be performed. During the dynamic memory allocation, resources and components (e.g., processor, definition file, frame buffer, and/or cache) of the display interfacing system 104 and AGS may be set to perform picture-within-picture processes once the PWP module 118 is activated. For instance, during initialization the definition file may be configured to define for the AGS a set of parameters for one or more widgets that allow user interaction with the UA 114 (e.g., via graphical user interface 116) to activate the PWP module 118 during run-time. The definition file may be configured to define a set of parameters for a second one or more widgets that allows user interaction with the UA 114 such that a specific portion the display 106 may be selected during run-time to provide additional, clarifying information about the specific portion(s) selected. In some embodiments, dynamic memory allocation provides capabilities to the display interfacing system 104 and the AGS to perform picture-within-picture processes, however, these processes may not actually be performed until a user input is received (e.g., enabling PWP module 118).

Figure 3:
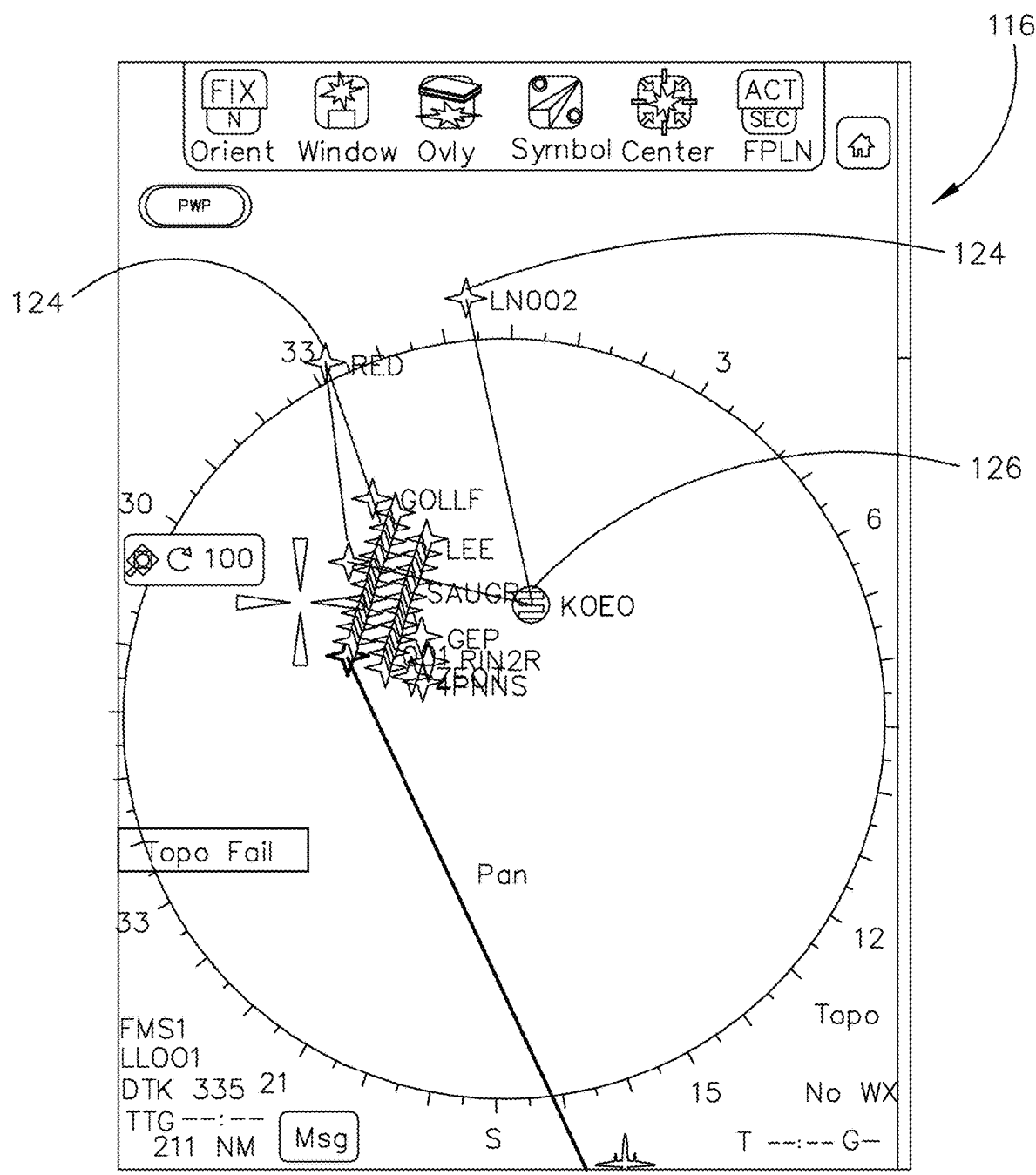
FIG. 3 is an exemplary embodiment of a graphical user interface (GUI) picture, according to the inventive concepts disclosed herein.

Referring now to FIG. 3, an exemplary embodiment of a GUI 116 of user interface 108 for interacting with a UA 114 (e.g., FMS) is depicted. In an exemplary embodiment, GUI 116 is configured for presenting a flight plan to a user (e.g., pilot or remote pilot). A flight plan typically includes one or more flight patterns. A flight pattern includes a sequence of legs that an aircraft, or a pilot, is instructed to follow one after another. The legs are typically established utilizing a plurality of waypoints and leg terminators. A flight pattern may include a SAR pattern. A parallel track SAR pattern with waypoints/leg terminators 124, as well as other types of navigational points 126 is depicted in FIG. 3 for illustrative purposes. In an exemplary embodiment, navigational point 126 is received from a third party application, such as an auxiliary flight management system (e.g., Mission FMS).

In an exemplary embodiment, the flight pattern is communicated by a UA 114 (e.g., FMS) to the AGS of the display 106 and created on the display 106. In another exemplary embodiment, the flight pattern is communicated by the UA 114 using information (e.g., definition file) from another UA of a third party application 112 (e.g., Mission FMS of military aircraft, military system, or combinations thereof).

Figure 4:
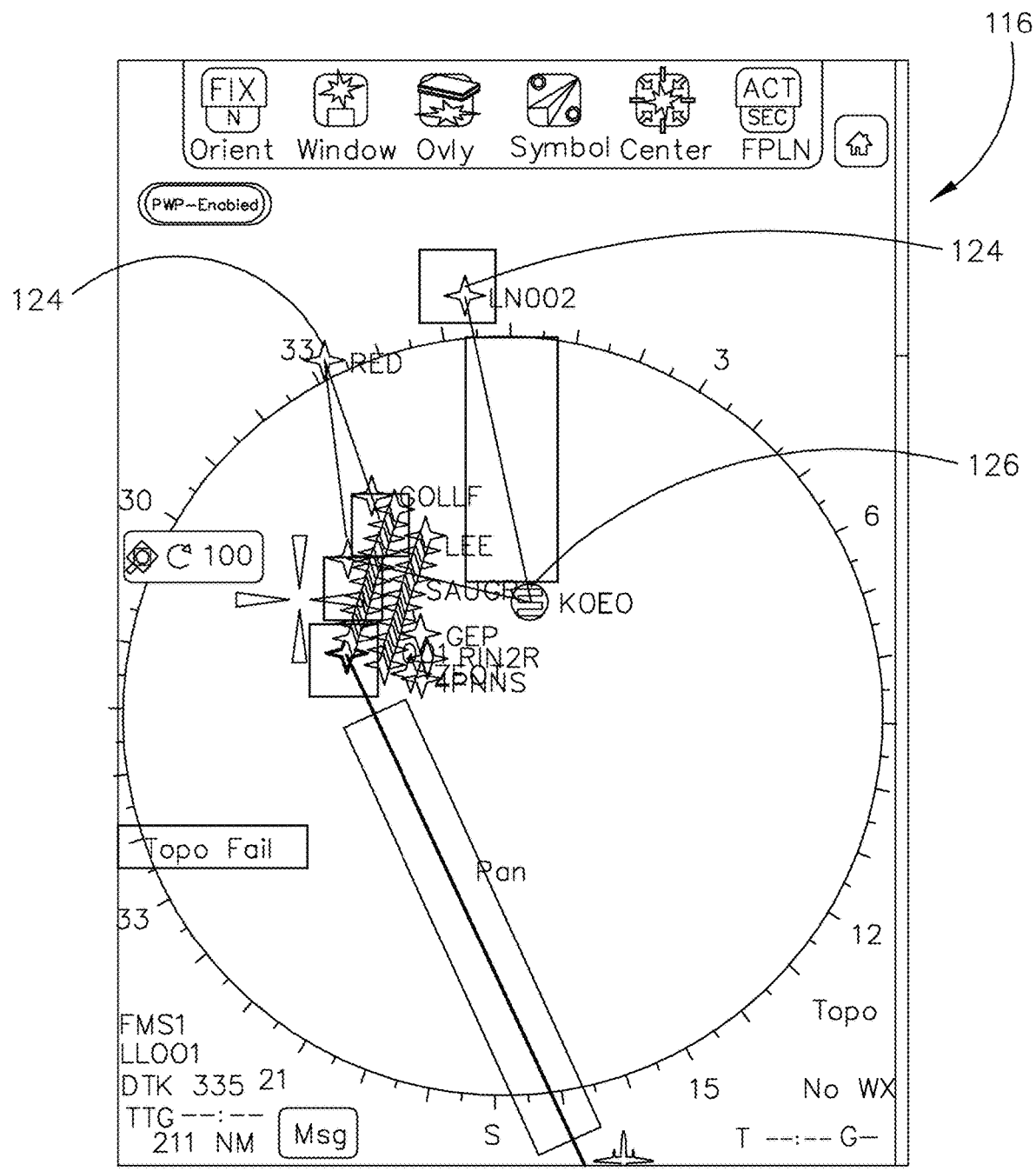
FIG. 4 is an exemplary embodiment of a GUI picture of FIG. 3 with widgets enabled, according to the inventive concepts disclosed herein.

Referring now to FIG. 4, once the PWP module 118 is enabled, the GUI 116 allows a user to interact (e.g., via widgets) with portions of the GUI 116 in order to obtain additional, clarifying information about portions of the GUI 116. For example, an operator may select a widget associated with a waypoint/leg terminator 124, an area near a waypoint/leg terminator 124, a flight leg, an area near a flight leg, or a final approach course fix (FACF) portion of the flight plan associated with GUI 116. The selecting may include, but is not limited to, clicking, touching, viewing (e.g., with gaze detector), providing a gesture (e.g., dragging finger around), or providing an audio signal/command to select a corresponding portion of the flight map/plan for which additional, clarifying information is desired.

Figure 5:
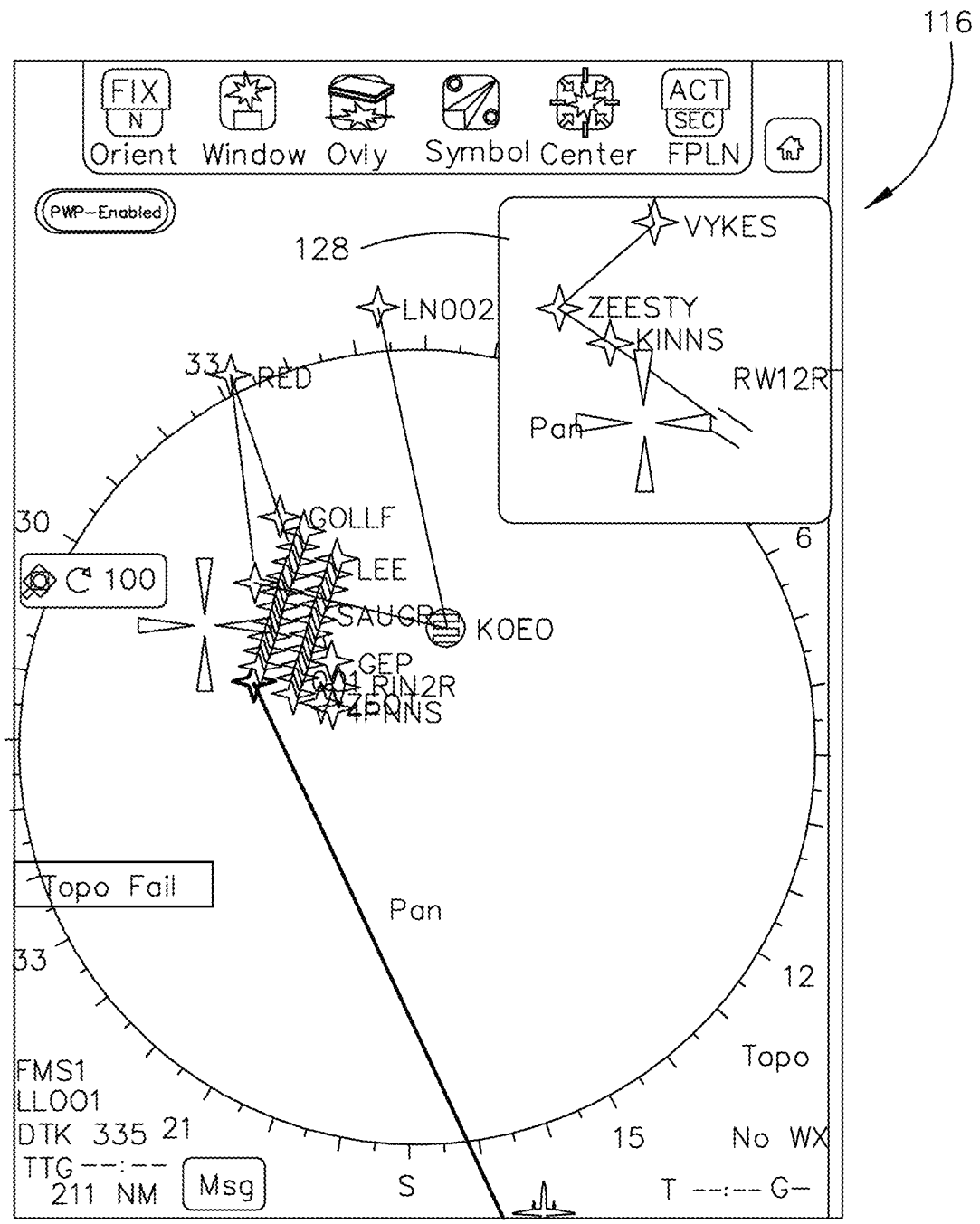
FIG. 5 is another exemplary embodiment of a GUI picture, according to the inventive concepts disclosed herein.

Referring now to FIG. 5, after the selecting, a second picture 128 is displayed (e.g., overlaid) in the GUI 116, offering additional, clarifying information about the selected symbol, area or portion. For instance, the second picture 128 may offer multiple levels (e.g., hierarchical levels) of waypoint information that may be useful at brief intervals, including, but not limited to, separate widget-enabled waypoints, required time of arrival (RTA) information specific to waypoints, weather information, instrument landing system (ILS) information, or combinations thereof. In an exemplary embodiment, the displaying of picture 128 is a display of a second hierarchical level of information within the GUI 116.

In some embodiments, the second picture 128 includes a page of data to provide the additional clarifying information. For example, the page of data may provide an aircraft additional, clarifying information regarding weather and/or ILS/GPS visual minimum requirements about the FACF.

Figure 6:
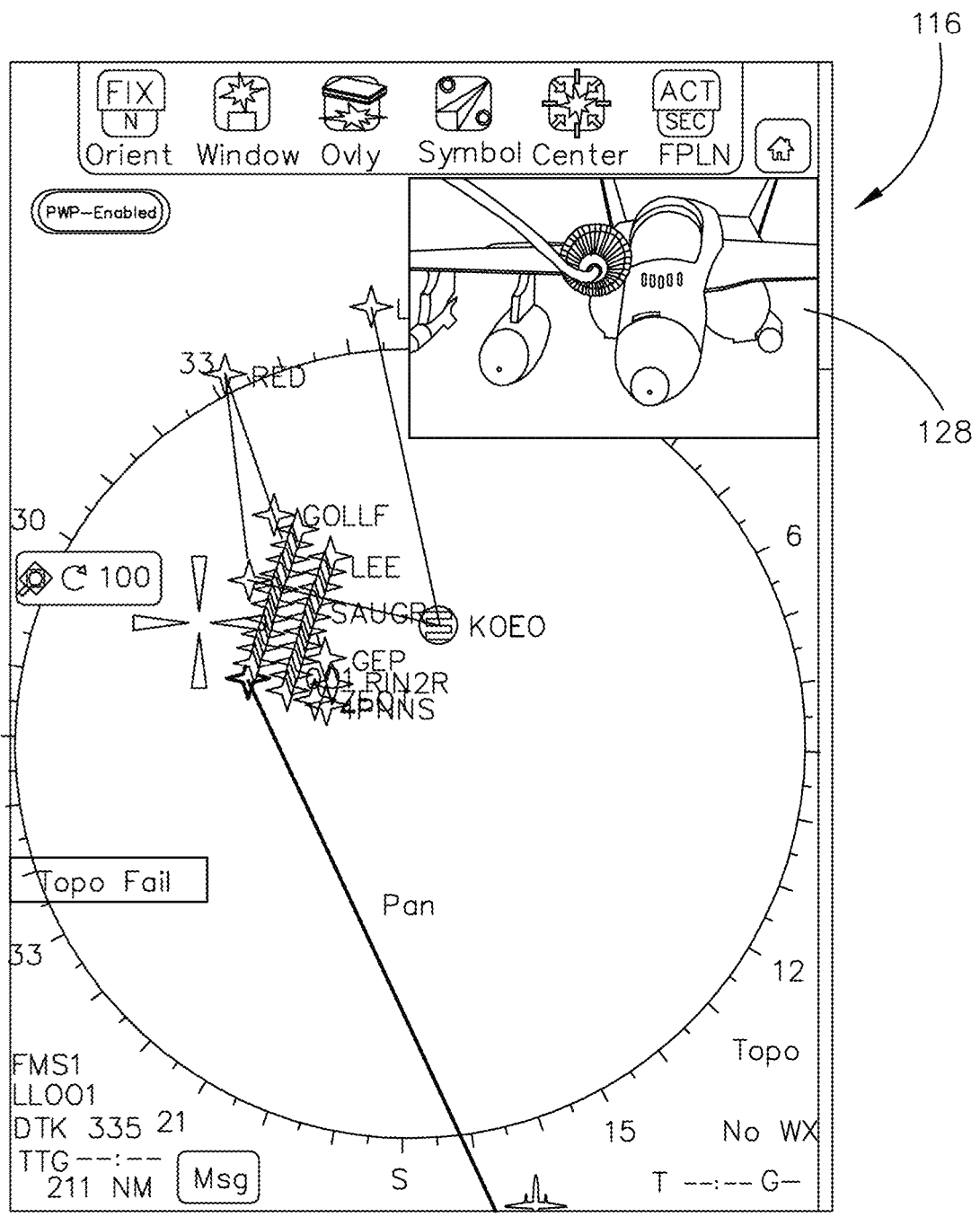
FIG. 6 is another exemplary embodiment of a GUI picture, according to the inventive concepts disclosed herein.

In some embodiments, the second picture 128 includes a video feed to provide the additional clarifying information. For example, referring now to FIG. 6, if an in-flight refueling (IFR) pattern is selected from the flight plan from GUI 116, the video feed may be provided by a sensor (e.g., camera) located on a tanker aircraft or a sensor (e.g., camera) located on a receiver aircraft to aid the pilot of the receiver aircraft in guiding the receiver aircraft during execution of the IFR pattern. By way of another example, if the flight pattern chosen was the FACF, the video feed may provide to an aircraft additional, clarifying information regarding weather and/or ILS/GPS visual minimum requirements from the runway threshold.

Figure 7:
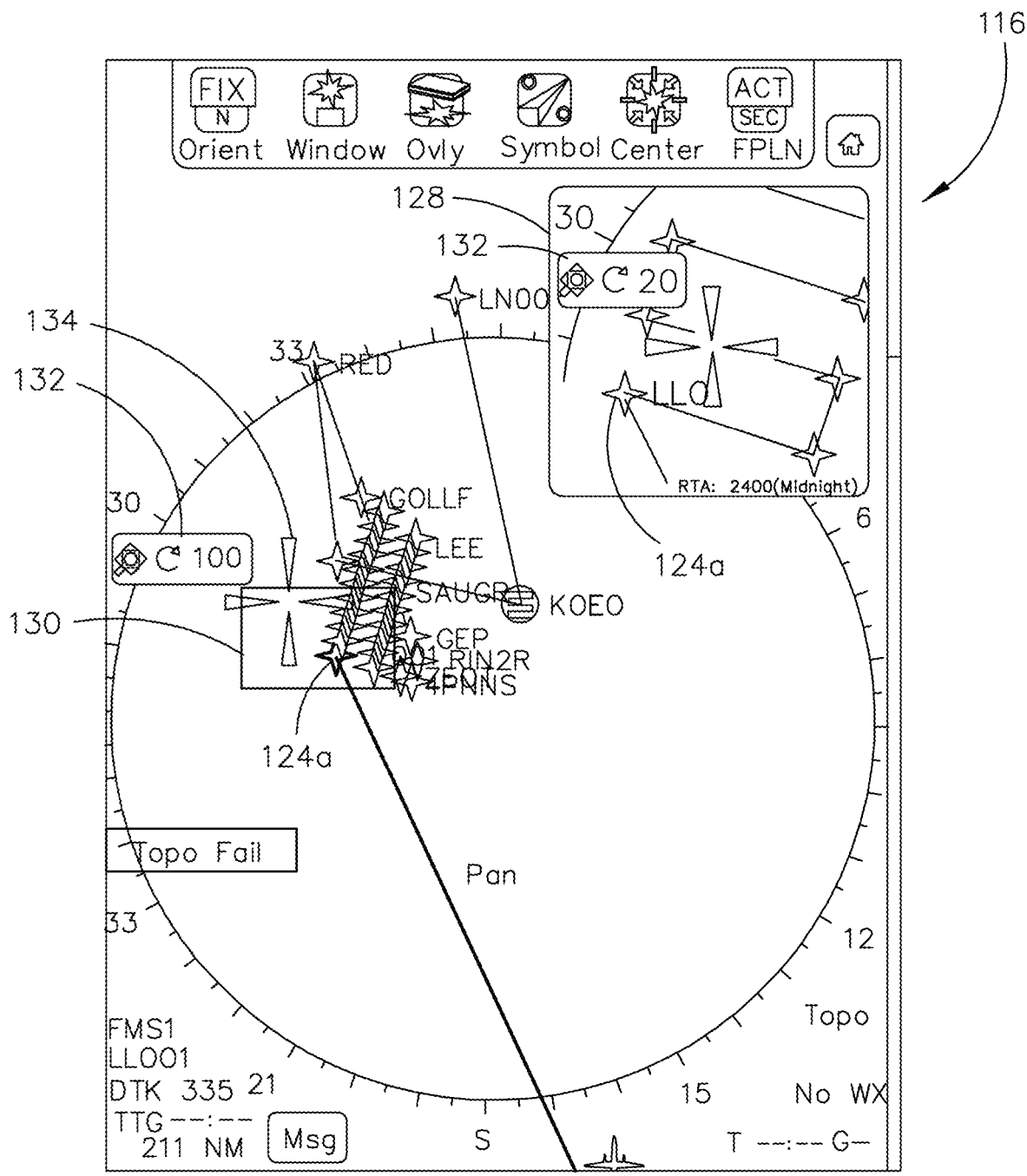
FIG. 7 is another exemplary embodiment of a GUI picture, according to the inventive concepts disclosed herein.

Referring now to FIG. 7, in some embodiments, the second picture 128 includes a zoomed-in portion of the GUI 116. For example, the operator may select an area 130 near waypoint 124*a*, and the second picture provides a zoomed-in view of the selected area proximal to the waypoint 124*a*. In some embodiments, the second picture 128 includes a scale/range ring 132 to provide the operator with contextual information. For example, the scale/range ring 132 may indicate a magnification amount, a level to which the operator has zoomed, or the size of the second picture 128 in relation to the GUI 116. In some embodiments, the scale/range ring 132 has a timer associated with it, such that the scale/range ring 132 only appears during a given time (e.g., 3-10 seconds) after selecting the area and displaying the second picture 128. After the passage of the given time, the scale/range ring 132 is no longer visible unless a cursor 134 is brought into the second picture 128. The removal of the scale/range ring 132 after the given time reduces symbols displayed, easing the cognitive processing requirements placed on the operator. In other embodiments, the cursor 134 automatically is moved to the second picture 128 when the second picture 128 is enabled, and the second picture 128 and/or the scale/range ring 132 is automatically removed when the cursor 134 is removed from the second picture 128.

In some embodiments the scale/range ring 132 is interactive. For example, an operator may select the scale/range ring 132 to adjust a magnification amount, level of zoom-in/out, or a size/scale of the second picture 128. In some embodiments, the second picture 128 is interactive (e.g., includes a second touch-GUI or another widget in the second picture 128). For example, referring again to FIG. 7, after an operator has selected an area 130 surrounding a waypoint 124*a*, and after the second picture 128 has provided a zoomed-in view of the area 130 surrounding the waypoint 124*a*, the operator may select the specific waypoint 124*a*. The selection of the specific waypoint 124*a* in the second picture 128 causes the presentation of another level (e.g., third hierarchical level) of additional, clarifying information (e.g., RTA) about the specific waypoint 124*a*.

It is noted that while FIG. 7 depicts the RTA about the specific waypoint 124*a* presented in the second picture 128, this specific depiction is not limiting. For example, to preserve the cognitive processing required to process information within the second picture 128, the RTA information about the specific waypoint 124*a* may be presented in empty space or another low-priority portion of GUI 116.

It is noted that while FIGS. 3-7 depict using the PWP module 118 after the flight plan has been created, this depiction is not limiting. For example, the PWP module 118 may be implemented during the creation of the flight plan. For instance, a pilot vehicle interface (PVI) including a CDU, an AGS, Integrated CDU Page Functions (ICPF), and/or flight planning pages, may be utilized in creating the flight plan. During the creation, the PWP module 118 may provide additional, clarifying information about portions of the flight plan that have been, or will be, created, thereby simplifying the flight plan creation process. For example, a first picture may include flight planning pages for creating a flight plan and a second picture 128 may include a VOR radial displaying a flight leg within a VOR radial as that flight leg is created using the flight planning pages.

Figure 8:
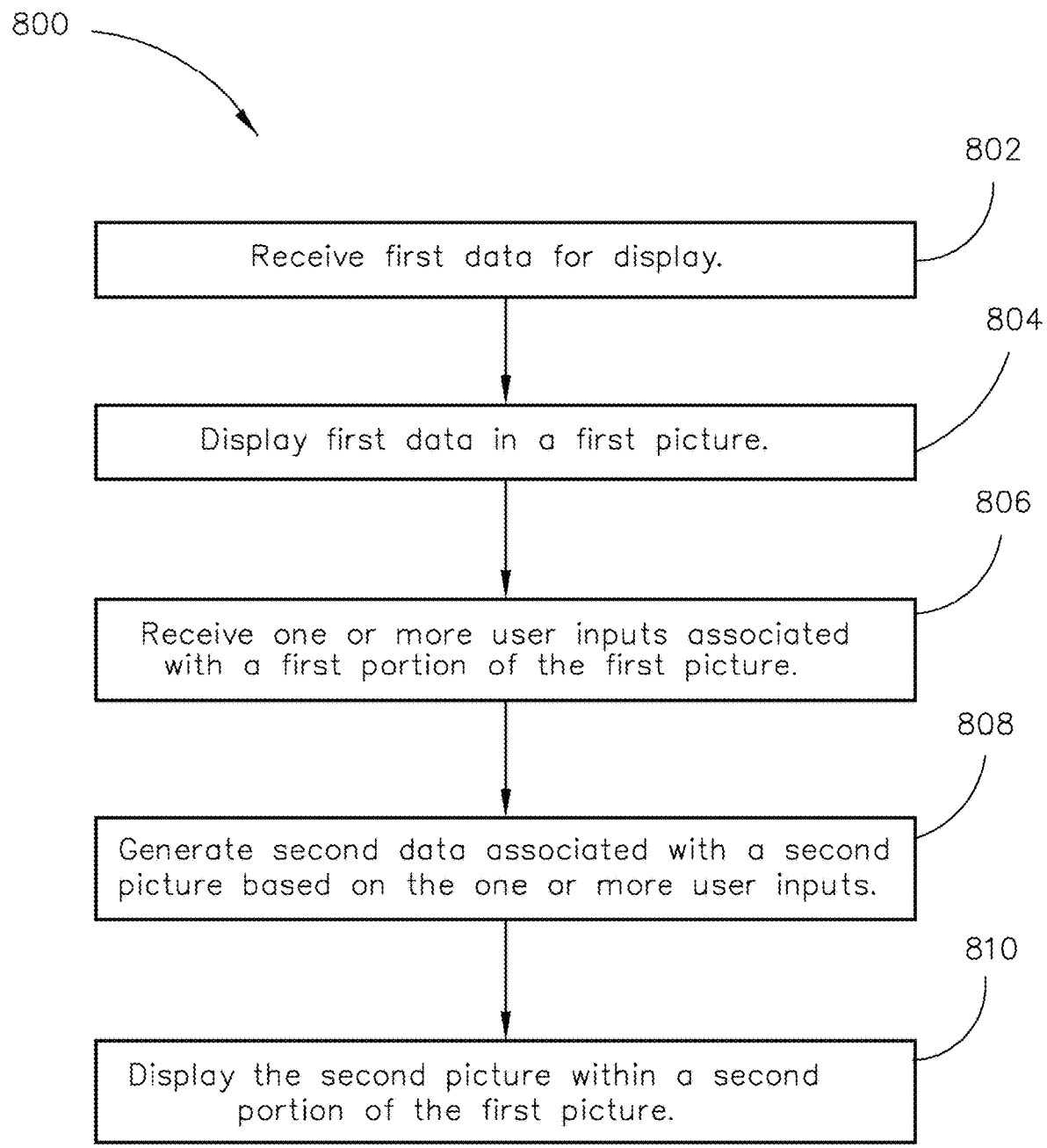
FIG. 8 is an exemplary embodiment of a method for presenting avionics data, according to the inventive concepts disclosed herein.

Referring now to FIG. 8, an exemplary embodiment of a method 800 according to the inventive concepts disclosed herein may include one or more of the following steps.

A step 802 may include receiving first data for display. In an exemplary embodiment, the first data is avionics data including information for generating a flight plan associated with a VOR (e.g., VOR/DME, VORTAC, or combinations thereof) radial.

A step 804 may include displaying the first data in a first picture (e.g., GUI 116). In an exemplary embodiment, the display interface 104 (e.g., CDS) is incorporated with a UA 114 (e.g., FMS) and display 106 in order to display the first data to an operator (e.g., pilot and/or remote pilot).

A step 806 may include receiving one or more user inputs associated with a first portion of the first picture. In an exemplary embodiment, the one or more user inputs are associated with a flight leg or a waypoint/leg terminator 124 widget. In another exemplary embodiment, the one or more user inputs are associated with an area 130 widget (e.g., button) proximal to the flight leg or the waypoint/leg terminator 124. In an exemplary embodiment, the one or more user inputs are associated with enabling a PWP module 118. For example, the one more user inputs may include applying pressure to a soft/hard key, issuing an audio signal/command, indicating with eye gestures areas of interest, or combinations thereof, in order to enable the PWP module 118.

A step 808 may include generating second data associated with a second picture 128 based on the one or more user inputs received. In an exemplary embodiment, generating second data includes generating rendering information. In an exemplary embodiment, enabling the PWP 118 automatically enables the generation of second data associated with the second picture 128. For example, once the PWP 118 is enabled, one or more algorithms may be performed to determine if multiple waypoints/leg terminators 124 are to be displayed on the display 106. If multiple waypoints/leg terminators 124 are to be displayed, then the one or more algorithms may also determine the proximity of each waypoint/leg terminator 124 to another waypoint/leg terminator 124, as displayed on the display 106. The one or more algorithms may also determine a threshold display distance that should exist between each waypoint/leg terminator 124 (e.g., without overlapping each other in the display 106), and if the threshold distance does not exist, then the waypoint/leg terminators will be grouped into sequential (e.g., with respect to the intended flight path) groupings of overlapping waypoint/leg terminators 124. Each grouping of overlapping waypoint/leg terminators will be configured for automatic display in a second picture 128 according to a predetermined scale/range (e.g., as indicated by scale/range ring 132) and according to the current flight course the aircraft is traveling.

In an exemplary embodiment, the other internal systems/system components 110 include, but are not limited to, GPS, Wide-area Augmentation System (WAAS), Distance Measuring Equipment (DME), a DME/DME system, an automatic dependent surveillance-broadcast (ADS-B) system, another suitable aircraft navigation system, another suitable alternate aircraft navigation system, or combinations thereof. In an exemplary embodiment, the PWP module 118 may be in communication with the other internal systems/system components 110, including an aircraft navigation system or alternate aircraft navigation system, in order to automatically display the second picture 128 as it corresponds to a position of the aircraft as determined by the aircraft navigation system or the alternate aircraft navigation system. For example, once the PWP module 118 has been enabled, automatic display of the second picture 128 may occur as related to a cluttered flight plan map and in correspondence with a position of the platform 102, resulting a portion of the cluttered flight plan map (e.g., area 130) that is de-cluttered in picture 128. The second picture 128 may have one or more widgets enabled within the second picture 128 for providing additional clarifying information about the automatic content generated.

In another exemplary embodiment, generating second data associated with the second picture 128 based on the one or more user inputs received further includes coordinating and/or exchanging data with a third party application 112. For example, the SAR pattern for a flight plan map may be received from a Mission FMS (e.g., military). The navigational point 126 indicating the SAR pattern received from the Mission FMS and displayed on a civil FMS may require access to a supplemental definition file to receive definitions for the navigational point 126 from the Mission FMS. In this regard, see U.S. application Ser. No. 14/584,807, by Jason A. Myren, et al., filed Dec. 29, 2014, which is incorporated herein by reference in its entirety.

A step 810 may include displaying the second picture 128 within a second portion of the first picture. In an exemplary embodiment, displaying the second picture 128 within the second portion includes rendering the second picture 128 from the second data generated in step 808. In an exemplary embodiment, the second picture 128 is positioned in any empty space existing in the first picture that is large enough to contain the second picture 128. However, if there is no empty space large enough, displaying the second picture 128 includes overlaying low priority data from the first picture with the second picture 128. For example, a portion of a VOR radial may be overlaid with the second picture 128. For instance, the second picture 128 may be a pop-over window that lasts for a period of time.

In some embodiments, where automatic display of groupings of waypoint/leg terminators 124 occurs (see, for example, FIGS. 4-5), each overlapping grouping of waypoints/leg terminators 124 is automatically displayed sequentially as the physical position of the aircraft coincides with a respective grouping. However, it is noted that the second picture 128 cannot overlay/obscure critical flight data (e.g., as displayed on a Primary Flight Display—PFD). Referring now to FIGS. 3-6, it is further noted that a flight plan map may include navigational data or crew awareness messages in the bottom left and bottom right portions of the GUI 116. In an exemplary embodiment, the navigational data or the crew awareness messages are assigned high priority values, such that the second picture 128 does not obscure this information.

In an exemplary embodiment, displaying the second picture 128 within a second portion of the first picture (e.g., GUI 116) includes displaying the second picture 128 such that the original content (e.g., widget) selected to display the second picture 128 is visible simultaneously with the second picture 128. For example, if the first picture is the flight plan map, as in FIG. 7, then the top-left and top-right portions of the flight plan map may be used to display the second picture 128 because displaying the second picture 128 in the top-left or top-right of GUI would allow the second picture 128 to be simultaneously visible with the specific waypoint 124a selected.

In another exemplary embodiment, displaying the second picture 128 within a second portion of the first picture (e.g., GUI 116) includes limiting the second picture 128 to being displayed within a specific region of multiple regions of the first picture. For example, if the first picture is the flight plan map (e.g., FIGS. 3-7), then the display may be limited by the AGS to presenting the second picture 128 within the top-left region and/or top-right region of the flight plan map.

In another exemplary embodiment, displaying the second picture 128 within a second portion of the first picture (e.g., 128) includes displaying the second picture 128 at a maximum distance measured from a reference point. In an exemplary embodiment, the reference point is the cursor 134. For example, as in FIG. 7, if the cursor 134 is used to select a specific waypoint 124a in GUI 116, then the second picture 128 may be displayed at a maximum distance from the cursor 134 used to make the selection. This allows the original content selected in GUI 116 to remain visible simultaneously with the second picture 128. In an exemplary embodiment, the maximum distance from the reference point is a maximum distance from the reference point that would not obscure widgets in the GUI 116, critical data, or high priority data. For example, displaying the second picture 128 at a maximum distance from the cursor 134 includes displaying the second picture 128 at a maximum distance from the cursor 134 that would not obscure a multiple-item-select menu.

Figure 9:
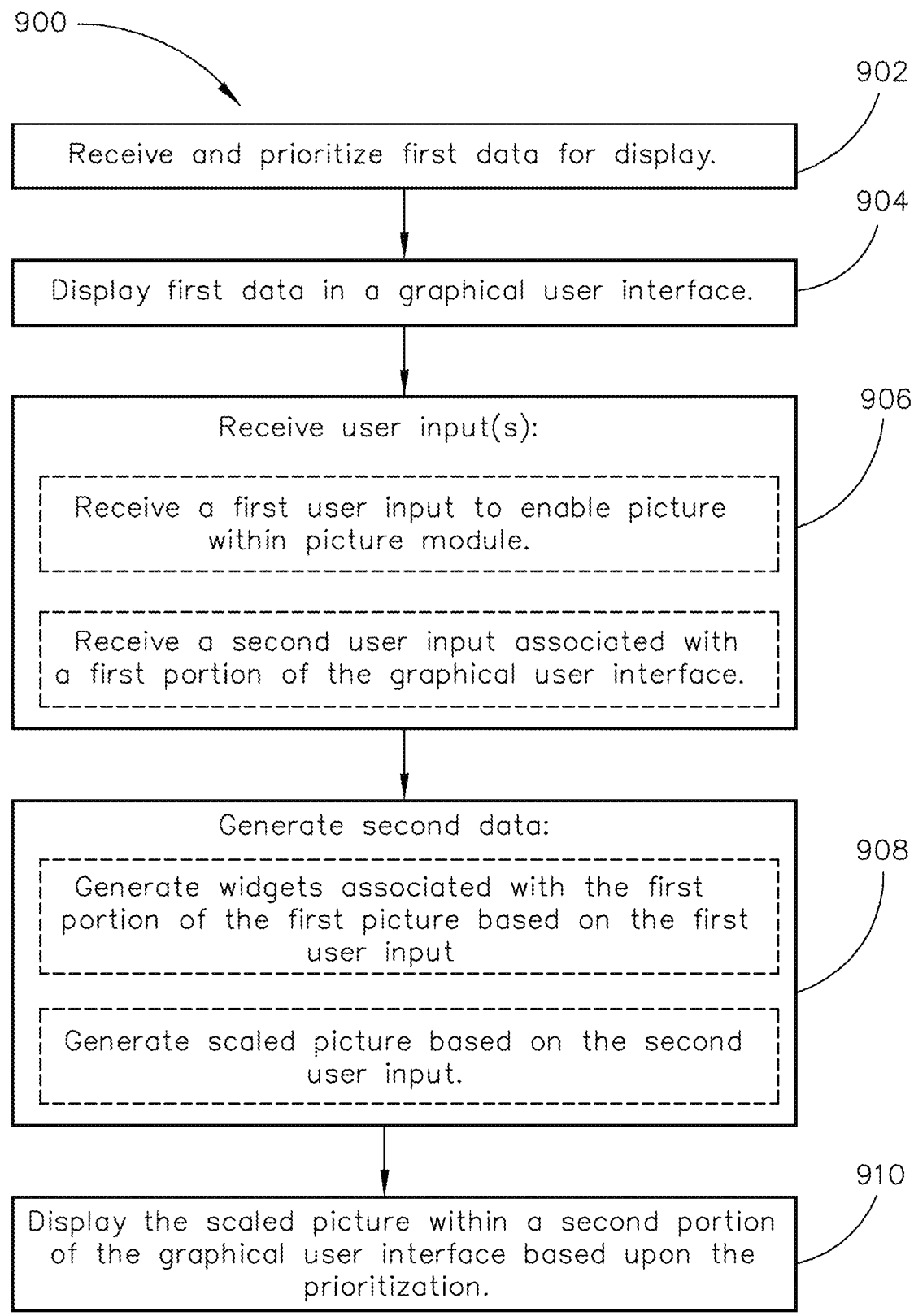
FIG. 9 is another exemplary embodiment of a method for presenting avionics data, according to the inventive concepts disclosed herein.

Referring now to FIG. 9, an exemplary embodiment of a method 900 according to the inventive concepts disclosed herein may include one or more of the following steps.

A step 902 may include receiving and prioritizing first data for display. In an exemplary embodiment, as the first data is received, a processor is configured to prioritize the first data. For example, the processor may prioritize the graphical data utilized in displaying a flight plan map into two or more hierarchical levels. In an exemplary embodiment, a first hierarchical level includes the flight plan map and an associated graphical image representing a VOR radial. The first hierarchical level may also be prioritized into sub-categories, including but not limited to, low-priority (e.g., portion of VOR radial not associated with a direction of travel, top-left corner of flight plan map, or top-right corner of flight plan map), mid-priority (e.g., portion of VOR radial associated with a current direction of travel), and high priority (e.g., current leg, waypoint/leg terminator 124 being traveled or navigational messages in bottom left corner or bottom right corner). In another exemplary embodiment, a second hierarchical level includes a second picture 128, clarifying the flight plan, and a third hierarchical level includes information (e.g., RTA) specific to a waypoint 124a, a leg, or a leg terminator found within the second picture 128.

In an exemplary embodiment, if the flight plan or a portion of the flight plan is received as graphical data and/or as an individual data unit (e.g., data file), then prioritizing the first data includes parsing (e.g., with a data parser) the graphical data and/or the data unit such that the parsed data may be prioritized.

A step 904 may include displaying the first data of step 902 in a GUI 116. In an exemplary embodiment, the display interface 104 (e.g., CDS) is incorporated with a UA 114 (e.g., FMS) in order to display the first data to an operator (e.g., pilot and/or remote pilot). In an exemplary embodiment, displaying the first data in a GUI 116 includes sectioning the GUI 116 into multiple portions. For example, the GUI 116 may be sectioned into areas, a mosaic, specific touch-sensitive x/y-coordinates, or combinations thereof, in order to display the first data according to the sectioned areas.

A step 906 may include receiving user input(s). In an exemplary embodiment, receiving user input(s) includes receiving two or more user inputs. In an exemplary embodiment, a first user input is associated with enabling the PWP module 118. For example, the first user input may be received and converted into a binary value or textual string that enables the PWP module 118. The second user input may be associated with a specific portion of the GUI 114, such that when the second user input is received in the specific portion, the second picture 128 is enabled. For example, the second user input may be associated with a flight leg, a waypoint/leg terminator 124, a grouping of waypoint/leg terminators 124, an area 130 proximal to the flight leg or the waypoint/leg terminator 124a, or combinations thereof. The two or more user inputs may include applying pressure to a soft/hard key, issuing an audio signal/command, indicating with eye gestures areas of interest, or combinations thereof.

A step 908 may include generating second data. In an exemplary embodiment, the second data is used to implement defined and parameterized widgets and a scaled picture 128 based on the user input(s) received in step 906. For example, the step 908 may include generating information (e.g., binary value or text string) to activate widgets associated with the first portion of the GUI 116 (e.g., according to definitions and parameters assigned during dynamic memory allocation). In this regard, once the PWP module 118 is enabled via user interaction with an activated first widget, one or more algorithms may be performed to utilize memory that was dynamically allocated during initialization in order to parameterize and define a second widget (e.g., or a third widget, a fourth widget) in the first portion, the second widget being associated with the flight leg, the waypoint/leg terminator 124, the grouping of waypoints/leg terminators 124, or the area 130 proximal to the flight leg or the waypoint/leg terminator 124a. In this regard, user interaction with the second widget is enabled using the second data generated.

In an exemplary embodiment, generating second data (e.g., step 908) also includes a processor in communication with the display making a determination that a user input cannot accurately be determined to be associated with a first widget as opposed to a second widget. For example, if two or more waypoints/leg terminators 124 are too close in proximity to each other, each having respective, associated widgets, even though a user may attempt to interact with a single waypoint/leg terminator 124a using the first widget, the processor cannot distinguish which widget the operator actually intended to interact with due to the close proximity of the widgets. Therefore, in some embodiments, the processor may be automatically configured to generate the second data to indicate to the AGS of display 106 that the second picture 128 should be displayed in order to provide more accurate interaction with widgets.

In an exemplary embodiment, generating second data (e.g., step 908) also includes generating data to render the second picture 128. In some embodiments, the second picture 128 is a scaled picture. In an exemplary embodiment, the cursor 134 is configured to automatically move to the second picture 128 after the second picture 128 has been enabled (see FIGS. 5 and 7). This allows the user to interact with the second picture 128 to more clearly indicate with which of the first widget or second widget the user was previously attempting to interact. In another exemplary embodiment, the display interfacing system 104 is configured to automatically disable or remove the second picture 128 as soon as the cursor 134 has been moved away from or out of the second picture 128.

In an exemplary embodiment, the scaled picture 128 is generated using a predetermined factor/parameter. For example, generating the scaled picture 128 may include using a predetermined scaling factor to magnify portions of the flight plan (e.g., or a copy of a portion of the displayed flight plan) such that overlapping legs or waypoints/leg terminators 124 are rendered separately and individually visible. For example, if a user moves the cursor 134 next to one or more waypoints/leg terminators 124 as in FIG. 7, then rendering data is generated using a scale factor (e.g., magnification level) of a predetermined amount. For example, a scaling matrix may be used according to the following:

$$\begin{bmatrix} x' \\ y' \end{bmatrix} = \begin{bmatrix} a & b \\ c & d \end{bmatrix} \times \begin{bmatrix} x \\ y \end{bmatrix} \quad (1)$$

where the matrix $$M = \begin{bmatrix} a & b \\ c & d \end{bmatrix}$$

is a 2D transformation matrix, and the column vector $$\begin{bmatrix} x \\ y \end{bmatrix}$$

is the point(s) x and y that are being transformed. Thus, according to methods known in the art, using an identity matrix $$M1 = \begin{bmatrix} a & 0 \\ 0 & d \end{bmatrix}$$

where a and d are any positive value, provides a 2D scaling factor. In an exemplary embodiment, using an identity matrix $$M2 = \begin{bmatrix} a & 0 & 0 \\ 0 & b & 0 \\ 0 & 0 & c \end{bmatrix}$$

where a, b and c are any positive values, provides a 3D scaling factor.

In an exemplary embodiment, because the scaling factor may take a picture from a first size to a second size, without changing the resolution, interpolation (e.g., bilinear) may be used in order to improve the image quality of the scaled picture (e.g., second picture or scaled picture 128).

In an exemplary embodiment, the user may increment/decrement the magnification/minification level (e.g., scale factor) using the scale/range ring 132. In an exemplary embodiment, the scaled picture 128, or the data generated for the scaled picture 128, includes a copy of a portion (e.g., area 130) of the GUI 116 with the scale factor applied.

A step 910 may include displaying the scaled picture 128 within a second portion of the GUI 116. In an exemplary embodiment, the first portion is associated with the widget used to display the second picture, and the second portion is associated with a location the second picture will be displayed. In an exemplary embodiment, displaying the scaled picture within the second portion includes rendering the scaled picture 128 from the second data generated in step 908 and translating/transforming the rendered, scaled picture 128 according to one or more affine transformations. For example, the scaled picture may undergo an affine transformation according to the following:

$$p' = x \cdot u + y \cdot v + t \quad (2)$$

where u, v, (basis vectors) and t (origin) are the frame for the affine space, and the change of frame is represented by equation (2). In matrix form we get the following:

$$p' = Mp \quad (3)$$

$$p' = \begin{bmatrix} a & b & t_x \\ c & d & t_y \\ 0 & 0 & 1 \end{bmatrix} \times \begin{bmatrix} x \\ y \\ 1 \end{bmatrix}$$

$$p' = \begin{bmatrix} a & b & c & t_x \\ d & e & f & t_y \\ g & h & i & t_z \\ 0 & 0 & 0 & 1 \end{bmatrix} \times \begin{bmatrix} x \\ y \\ z \\ 1 \end{bmatrix} \quad (4)$$

where equation (3) is for 2D space and equation (4) is for 3D space.

In an exemplary embodiment, the scaled picture 128 is positioned in any empty space existing in the GUI 116 that is large enough to contain the scaled picture 128. However, if there is no empty space large enough, displaying the scaled picture 128 includes overlaying low priority data of the first hierarchical level of the GUI 116 with the scaled picture 128. For example, a portion of an illustrated VOR radial may be overlaid with the scaled picture 128.

In an exemplary embodiment the methods disclosed herein may be performed as a set of software instructions executable by an ASIC or an FPGA. In another exemplary embodiment, the instructions and the ASIC or FPGA may be configured as a kit. In another exemplary embodiment an FMS includes a PCI or PCI-E port configured to receive a higher-performance graphics card (e.g., video card) such that the FMS can use the graphics card instead of integrated graphics or simultaneously together with integrated graphics. For example, the integrated graphics may be configured to feed GUI 116 and the high performance graphics card may be configured to feed the second picture 128, or visa-versa. In an exemplary embodiment, the high performance graphic card is a component of the kit. In another exemplary embodiment, an accelerated processing unit (APU) for increasing the processing capabilities of a display interfacing system 104, is included as a component of the kit.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system, comprising:
  a display;
  at least one processor coupled with the display and with a non-transitory processor-readable medium storing processor-executable code, which when executed by the at least one processor, causes the at least one processor to:

access and prioritize first avionics data for display, the first avionics data comprising a flight plan map;
prioritize the flight plan map into two or more hierarchical levels, a first hierarchical level further subdivided into at least a low-priority category including a portion of VOR radial not associated with a direction of travel and a mid-priority category including portion of VOR radial associated with a current direction of travel;
provide the first avionics data to the display to render a first picture, the first picture comprising a graphical user interface;
generate second avionics data associated with a second picture based on one or more user inputs received at a first portion of the graphical user interface, the second avionics data comprising data corresponding to a widget generated from a third-party application with reference to a definition file received from the third-party application;
provide the second avionics data to the display to render the second picture and present the second picture within a second portion of the graphical user interface based upon the prioritizing and the second avionics data; and
de-render the second picture after a defined duration, wherein:
the second portion at least partially overlays a low priority portion of the first picture, the low priority portion of the first picture defined by the prioritization, and avoid the mid-priority category of the flight plan map; and
the second portion has a prioritization value higher than the low priority portion.

2. The system of claim 1, wherein the at least one processor is further configured to present the second picture within the second portion of the graphical user interface based upon the prioritizing and the second avionics data by overlaying a low-priority portion of the graphical user interface with the second picture.

3. The system of claim 1, wherein the second picture within the second portion is simultaneously visible with the first portion.

4. The system of claim 1, wherein the at least one processor is further configured to prioritize the first avionics data for display by creating a hierarchy of graphical data with two or more hierarchical levels.

5. The system of claim 4, wherein a first hierarchical level of the two or more hierarchical levels comprises the first avionics data organized and maintained by a system within an aircraft flight deck, and wherein a second hierarchical level of the two or more hierarchical levels comprises the second picture.

6. The system of claim 5, wherein the system within the aircraft flight deck comprises at least one of: a flight management system (FMS), a control display unit (CDU), and an engine indicating and crew alert system (EICAS).

7. The system of claim 6, wherein the system within the aircraft flight deck is the FMS.

8. The system of claim 7, wherein an aspect of the flight plan map that is clarified with additional information comprises at least one of: a waypoint, a leg terminator, a first area associated with the waypoint, a second area associated with the leg terminator, and a refueling pattern.

9. The system of claim 1, wherein the at least one processor is further configured to i) receive a first user input to enable a picture-within-picture module, and ii) receive a second user input associated with the first portion of the graphical user interface to parameterize and define the second picture.

10. A display interface, comprising:
an automated graphics system (AGS), the AGS in communication with a flight management system (FMS) and configured to receive a flight plan and first graphical data for the flight plan from the FMS; and
at least one processor with a non-transitory processor-readable medium storing processor-executable code, which when executed by the at least one processor, causes the at least one processor to:
access, parse and prioritize the first graphical data for display;
prioritize the flight plan into two or more hierarchical levels, a first hierarchical level further subdivided into at least a tow-priority category including a portion of VOR radial not associated with a direction of travel and a mid-priority category including portion of VOR radial associated with a current direction of travel;
provide the first graphical data and the flight plan as a graphical user interface to a display;
receive one or more user inputs associated with a first portion of the graphical user interface;
generate second graphical data based on the one or more user inputs;
provide the second avionics data to the display to present the second picture within a second portion of the graphical user interface based upon the prioritizing and the second avionics data, and avoid the mid-priority category of the flight plan, the second avionics data comprising data corresponding to a widget generated from a third-party application with reference to a definition file received from the third-party application;
move a cursor to the second portion;
de-render the second picture when the cursor is moved out of the second portion;
wherein:
the second portion at least partially overlays a low priority portion of the first picture, the low priority portion of the first picture defined by the prioritization; and
the second portion has a prioritization value higher than the low priority portion.

11. The display interface of claim 10, wherein the at least one processor is further configured to receive the one or more user inputs associated with the first portion of the graphical user interface by associating the one or more user inputs with a widget within the graphical user interface.

12. The display interface of claim 10, wherein the second graphical data comprises rendering information to render the second picture.

13. The display interface of claim 10, wherein the at least one processor is further configured to provide the second avionics data to the display to present the second picture within the second portion of the graphical user interface based upon the prioritizing and the second avionics data by performing a magnification of the first portion of the graphical user interface and further performing one or more affine transformations to position the second picture, scaled according the magnification, within the second portion of the graphical user interface.

14. The display interface of claim 10, wherein the first graphical data comprises a first hierarchical level of data for display, and wherein the second graphical data comprises a second hierarchical level of the data for display automatically displayed based on aircraft position.

15. A method, comprising:
accessing and prioritizing, by at least one processor, first avionics data for display, prioritizing comprising assigning a priority value to each avionics datum in the first avionics data, the first avionics data comprising a flight plan map;
prioritizing, by the at least one processor, the flight plan map into two or more hierarchical levels, a first hierarchical level further subdivided into at least a low-priority category including a portion of VOR radial not associated with a direction of travel and a mid-priority category including portion of VOR radial associated with a current direction of travel;
providing, by the at least one processor, the first avionics data to a display to render a first picture, the first picture comprising a graphical user interface;
generating, by the at least one processor, second avionics data associated with a second picture based on one or more user inputs received at a first portion of the graphical user interface, the first portion at least partially comprising a low priority portion including avionics data having a low priority value, the second avionics data comprising data corresponding to a widget generated from a third-party application with reference to a definition file received from the third-party application;
providing, by the at least one processor, the second avionics data to the display to render the second picture and present the second picture having a higher priority value than the low priority portion within a second portion of the graphical user interface, at least partially overlaying the low priority portion, based upon the prioritizing and the second avionics data, and avoiding the mid-priority category of the flight plan map;
move a cursor to the second portion; and
de-render the second picture when the cursor is moved out of the second portion or after a given duration.

16. The method of claim 15, wherein providing, by the at least one processor, the second avionics data to the display to render the second picture and present the second picture within the second portion of the graphical user interface based upon the prioritizing and the second avionics data comprises overlaying a low priority portion of the graphical user interface with the second picture.

17. The method of claim 15, wherein prioritizing the first avionics data for display comprises creating a hierarchy of graphical data having three or more hierarchical levels.

18. The method of claim 17, wherein creating the hierarchy of graphical data having three or more hierarchical levels comprises creating a first hierarchical level comprising the first avionics data, wherein the first hierarchical level is further prioritized into two or more sub-categories.

19. The method of claim 18, wherein the two or more sub-categories comprise critical and high priority, wherein creating the hierarchy of graphical data having three or more hierarchical levels comprises creating a second hierarchical level and a third hierarchical level, the second hierarchical level comprising the second avionics data associated with the second picture, the third hierarchical level comprising detailed information clarifying an aspect of the second picture, and wherein data from the second hierarchical level or the third hierarchical level is rendered and presented without obstructing data from the first hierarchical level having critical or high priority.

20. The method of claim 17, wherein creating the hierarchy of graphical data having three or more hierarchical levels comprises organizing and maintaining, by a system within an aircraft flight deck, the first avionics data, the second avionics data, the second picture, and detailed information clarifying an aspect of the second picture, and wherein the system within the aircraft flight deck comprises at least one of: a flight management system (FMS), a control display unit (CDU), and an engine indicating and crew alert system (EICAS).

* * * * *